T. E. C. Brinly,
Making Plow Irons,
Nº 21,547.  Patented Sep. 21, 1858
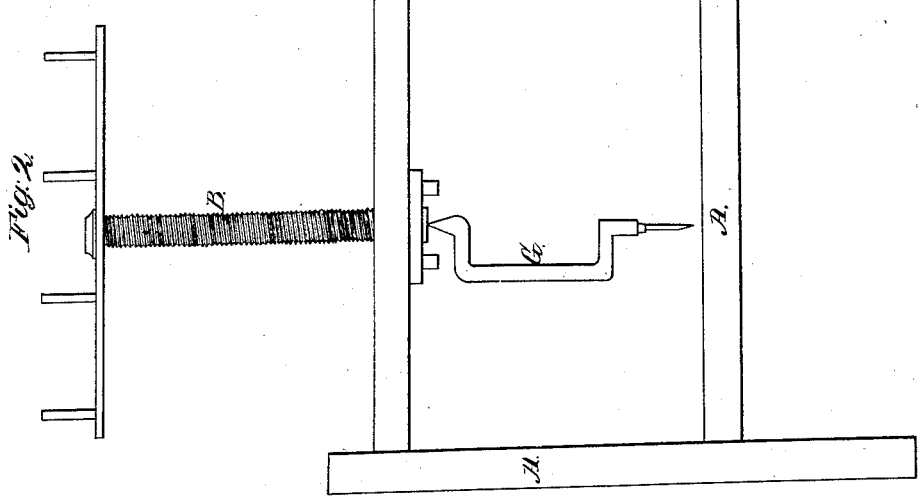
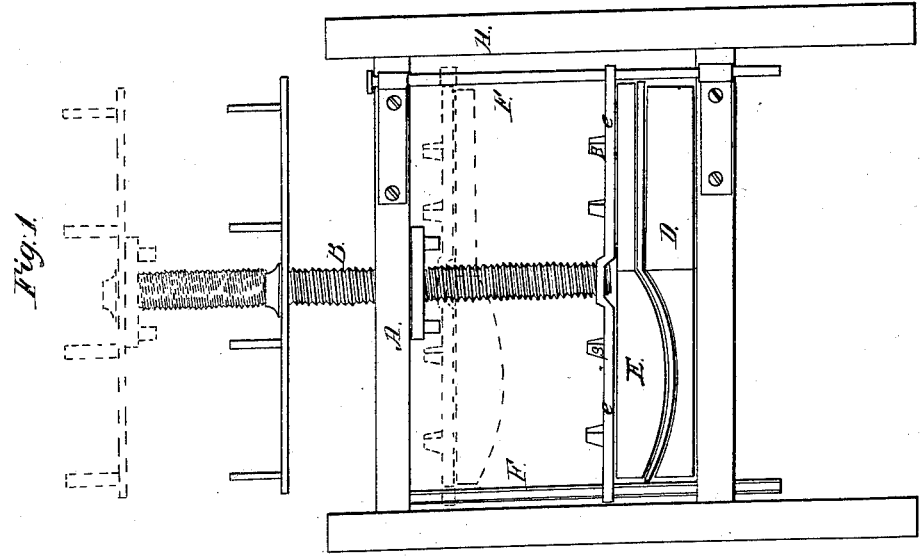

UNITED STATES PATENT OFFICE.

T. E. C. BRINLY, OF SIMPSONVILLE, KENTUCKY.

PLOW-PRESS AND DRILL.

Specification of Letters Patent No. 21,547, dated September 21, 1858.

*To all whom it may concern:*

Be it known that I, T. E. C. BRINLY, of Simpsonville, in the county of Shelby and State of Kentucky, have invented a new and Improved Plow-Press and Drill; and I do hereby declare that the following is a full and exact description thereof, reference being had to the accompanying drawings and to the letters of reference marked thereon.

My invention consists of an improvement in plow presses and drills.

In the accompanying drawings, Figure 1, is a side elevation of my plow-press, the red lines showing the follower and screw when elevated. Fig. 2, is a side view, with the bed of the press and the follower removed, and the drill inserted ready for boring the plates.

My machine has any suitable frame A. Into the upper cross bar is inserted a screw B, which may be worked by a hand-wheel C. The bed D, of the press has its upper surface made of a form corresponding to that of the mold board, and the under side of the follower E, is also made to correspond to the same form.

The follower E, is attached to the screw B, by bars *e*, which are held in place by the small screw bolts *s*. The follower E, is raised and lowered by the screw B, and at the same time the ends of the follower are kept in proper line by the guide rods F.

In Fig. 2, G, is the drill for boring the requisite holes in the plow plate.

The operation of my machine is as follows. The follower E, is detached from the screw B, by removing two of the screw-bolts *s*, and one of the bars *e*. Then the follower and also the bed D, of the press are moved and the drill G, is inserted, as shown in Fig. 2. The plow plate is then placed upon the lower cross bar of the frame A, and the requisite holes are bored by the drill G, which may be worked either by hand or by any power.

After a suitable number of plates have been bored, the drill is removed and the bed of the press and also the follower are put in place, as seen in Fig. 1. The bored plates are then inserted into the press, and by means of the screw B, the follower E, is brought down, and thus the plates are warped of the desired form.

I am aware that presses and also drills have been employed in making mold boards of plows and I do not claim any of the separate devices employed by me; but What I do claim and desire to secure by Letters Patent of the United States is—

The above described press in combination with the drill for pressing and drilling the mold boards of plows, the whole being constructed, arranged and operated substantially as set forth.

In testimony whereof I have hereunto set my hand this 2nd day of June 1858.

T. E. C. BRINLY.

Witnesses:
GEO. E. HERRICK,
GEO. HINKLE.